United States Patent [19]

Maeoka et al.

[11] Patent Number: 6,030,484
[45] Date of Patent: Feb. 29, 2000

[54] PRODUCTION METHOD FOR LAMINATED AIR FILTER

[75] Inventors: Takuya Maeoka; Norikane Nabata; Toshiaki Ishino, all of Osaka, Japan

[73] Assignee: Nitto Denko Corporation, Osaka, Japan

[21] Appl. No.: 09/141,110

[22] Filed: Aug. 27, 1998

[30] Foreign Application Priority Data

Sep. 2, 1997 [JP] Japan ..................................... 9-236898
Apr. 27, 1998 [JP] Japan .................................. 10-117517

[51] Int. Cl.⁷ ........................... B01D 39/16; B32B 31/04; B32B 31/12; B32B 31/14
[52] U.S. Cl. ........................... 156/309.9; 55/486; 55/528; 55/DIG. 5; 156/309.6; 156/322; 156/324; 264/234; 264/344; 264/345; 428/316.6; 428/421; 442/397
[58] Field of Search .................................. 156/309.6, 322, 156/324, 309.9; 264/234, 344, 345; 442/397; 428/421, 316.6; 55/486, 528, DIG. 5

[56] References Cited

U.S. PATENT DOCUMENTS 5,234,739  8/1993  Tanaru et al. ............................ 428/131
5,772,884  6/1998  Tanaka et al. ................... 264/210.7 X

*Primary Examiner*—Adrienne C. Johnstone
*Attorney, Agent, or Firm*—Sughrue, Mion, Zinn, Macpeak & Seas, PLLC

[57] ABSTRACT

An air filter comprising a laminate of a non-woven fabric made up of polyolefin fibers or polyester fibers or a composite of the non-woven fabrics and a PTFE porous film, wherein the amount of the total gases generated from the air filter is 20 $\mu$g/g by the analysis of gas chromatography. The amount of the gases generated from the air filter is greatly reduced by heat-treating the non-woven fabric at a temperature of from 80 to 130° C. for from 5 minutes to 20 minutes before or after laminating with the PTFE porous film.

1 Claim, No Drawings

PRODUCTION METHOD FOR LAMINATED AIR FILTER

FIELD OF THE INVENTION

The present invention relates to an air filter having low degassing (gas generating) property using a polytetrafluoroethylene (PTFE) porous film and to a production method thereof, and the air filter of the present invention has an excellent performance having no problem of causing a degassing property (i.e., the generation of gases).

BACKGROUND OF THE INVENTION

Hitherto, as a material for air filters for clean rooms, a filter material prepared by adding a binder to glass fibers and subjecting the resulting glass fibers to processing by a paper manufacturing machine is frequently used. However, in such materials, there are various problems. For example, the existence of small fibers attached to the filter material, the increase of a pressure loss in the case of increasing the amount of a binder for preventing the self dust generation at working or bending the filter material (JP-A-63-16019) (the term "JP-A" as used herein means an unexamined published Japanese patent application), etc. Furthermore, in the filter material, there is also a problem that when the filter material comes in contact with a certain kind of chemicals such as hydrofluoric acid, the glass and binder are deteriorated to cause the generation of dusts.

For solving these problems, recently, a PTFE porous film is used in various fields as the filter material for filter. The PTFE film is useful as the filter materials for filters used in the fields requiring severe clean environment, such as a semiconductor production, etc., as described in JP-A-59-152825, 3-221541, 5-202217, and 7-196831, and PCT WO 94/16802).

Because such a useful PTFE porous film itself has a weak strength, a non-woven fabric or a woven fabric of polyethylene, polyester, etc., is laminated as a reinforcing material to improve the strength and the folding workability thereof.

However, there is a problem that a gas such as 2,6-di-tert-butyl-p-cresol (BHT), dibutyl phthalate (DBP), etc., which is said to give bad influences on the products in the field of the semiconductor production requiring a severe clean environment, is leaked from the non-woven fabric which is laminated as the reinforcing material, though the PTFE is a clean material.

SUMMARY OF THE INVENTION

The present invention has been made for solving the above-described problems.

That is, according to a first aspect of the present invention, there is provided an air filter comprising a laminate of a non-woven fabric made up of fibers containing at least one selected from polyolefins and polyesters as the main component or a composite composed of the non-woven fabrics and a polytetrafluoroethylene porous film, wherein the total amount of gases generated from the air filter is not more than 20 $\mu$g/g as a result of quantitative analysis by gas chromatography.

Also, in the air filter of the present invention, it is preferred that the non-woven fabric is heat-treated.

According to a second aspect of the present invention, there is provided a production method of an air filter, which comprises heat-treating a non-woven fabric made up of fibers containing at least one kind selected from polyolefins and polyesters as the main component or a composite of the non-woven fabrics at a temperature of from 80° C. to 130° C. for from 5 minutes to 20 minutes and thereafter laminating the non-woven fabric or the composite thereof with a polytetrafluoroethylene porous film.

Furthermore, according to a third aspect of the present invention, there is provided a production method of an air filter, which comprises laminating a non-woven fabric made up of fibers containing at least one kind selected from polyolefins and polyesters as the main component or a composite of the non-woven fabrics and a polytetrafluoroethylene porous film, and thereafter heat-treating the resulting laminate at a temperature of from 80° C. to 130° C. for from 5 minutes to 20 minutes.

DETAILED DESCRIPTION OF THE INVENTION

Then, the present invention described in detail.

In the air filter of the present invention, there is no particular restriction on the non-woven fabric used as the reinforcing material if the non-woven fabric is made up of fibers containing at least one kind of polyolefins and polyesters as the main components or a non-woven fabric made up of the composite of these non-woven fabrics described above and commercially available products can be used.

The polyolefins used in the present invention include polyethylene (PE), polypropylene (PP), etc., and the polyesters used in the present invention include polyethylene terephthalate (PET), etc.

The composite non-woven fabric used in the present invention is, for example, composite fibers of a core/sheath structure and includes a composite non-woven fabric wherein the core component is made up of synthetic fibers having a relatively higher melting point than that of the sheath component, a double layer non-woven fabric made up of a low-melting material and a high-melting material, a composite non-woven fabric prepared by fusing a powder of the low-melting material onto the surface of a non-woven fabric of the high-melting material. As commercially available composite non-woven fabrics can be used in the present invention and they include, for example, ELEVES T0153WDO (trade name, manufactured by UNITIKA LTD., a composite non-woven fabric of a core/sheath structure of PE and PET), Syntex R-250 (trade name, manufactured by MITSUI PETROCHEMICAL INDUSTRIES, LTD., a composite non-woven fabric of PETS), and TAPYRUS SN32ESB-SHP10 (trade name, manufactured by Tonen Tapyrus K.K., a composite non-woven fabric prepared by fusing the powder of PE onto the non-woven fabric of PET).

In the air filter of the present invention, the PTFE porous film can be prepared, for example, by the following method.

First, a fine powder of PTFE is mixed with a liquid lubricant, and the resulting mixture is molded into a sheet form in an unsintered state by at least one method of an extrusion method and a rolling method to obtain a sheet-form molding.

There is no particular restriction on the above-described fine powder of PTFE and commercially available products can be used. Examples of the commercially available products include Polyflon F-104 (trade name, manufactured by DAIKIN INDUSTRIES, LTD.), Fluon CD-123 (trade name, manufactured by Asahi•ICI Fluoropolymers K.K.), and Teflon 6J (trade name, manufactured by DU PONT-MITSUI FLUOROCHEMICALS CO., LTD.).

Also, any liquid lubricant can be used in the present invention, as long as the lubricant can wet the surface of the fine powder of PTFE and can be removed by a method of evaporation, extraction, etc. after obtaining the above-described sheet-form molding. Examples of the liquid lubricant include hydrocarbon oils such as liquid paraffin, a naphtha, a white oil, toluene, xylene, etc.; alcohols, ketones, esters, and mixtures of 2 or more kinds of them.

The addition amount of the liquid lubricant to the fine powder of PTFE can be selected appropriately depending on the kinds of the fine powder of PTFE and the liquid lubricant and the molding method of obtaining the sheet-form molding, but the amount of the liquid lubricant is generally from 5 to 50 parts by weight per 100 parts by weight of the fine powder of PTFE.

As examples of the method of molding a mixture of the fine powder of PTFE and the liquid lubricant into a sheet form by at least one method of an extrusion method and a rolling method, there are a method which comprises extruding a mixture of the fine powder of PTFE and the liquid lubricant into a rod form, and rolling the rod into a sheet form by a pair of rolls and a method which comprises extruding the mixture into a plate form to form a sheet thereof. The thickness of the thus-obtained sheet form molding is usually from 0.05 to 0.5 mm.

Then, the liquid lubricant contained in the sheet-form molding is removed. The removal of the liquid lubricant can be carried out by a heating method, an extrusion method or a combination of these methods.

Finally, the sheet-form molding from which the liquid lubricant was removed is stretched to at least one axial direction to make the molding porous. There is no restriction on the stretching temperature and the stretching ratio (drawing ratio).

The production method of an air filter according to the present invention has the characteristic in that a heat treatment is carried out in laminating the non-woven fabric and the PTFE porous film described above to produce a filter. The heat treatment can be effected either before or after laminating the non-woven fabric and the PTFE porous film.

The method of the heat treatment is not limited, as long as the method can heat-treating the non-woven fabric or the PTFE porous film air filter at a temperature of from 80° C. to 130° C. for from 5 minutes to 20 minutes. But, a method of passing the non-woven fabric or the PTFE porous film air filter through the inside of a heating furnace while fixing both ends of the non-woven fabric or the air filter and a method of moving the non-woven fabric or the PTFE porous film air filter along a heated roll are preferred because a heat stress is hard to occur.

As a method of laminating the non-woven fabric and the PTFE porous film, there are a method of spray coating an adhesive onto the non-woven fabric and laminating the non-woven fabric with the PTFE porous film and a method of laminating them by heating, but the method is not limited to these methods.

Then, the present invention is practically explained by the following examples.

In addition, the quantitative analysis of the generated gas (DBP, BHT, hydrocarbon, toluene, etc.) by gas chromatography (GC) in the examples was carried out by introducing a gas generated using a purge & trap type Curie point headspacer sampler (JHS-100A, trade name, manufactured by Nippon Bunseki Kogyo K.K.) to a GC (GC-17A, trade name, manufactured by SHIMADZU CORPORATION) for analysis. The measurement conditions were as follows.

Headspace Sampler Conditions
 Primary desorption temperature: 120° C.×20 minutes
 Secondary adsorption temperature: −40° C.
 Secondary desorption temperature: 358° C.×30 seconds
GC Measurement Conditions
 Column: UA-1 0.25 mmφ×30 m, df=0.25 μm
 Detector: FID
 Column temperature: 45° C. (3 minutes)→10° C./minute→260° C. (3 minutes)
 Carrier gas: Helium

EXAMPLE 1

The four edges of each of ELEVES T0153WDO (trade name, manufactured by UNITIKA LTD.) and TAPYRUS SN32ESB-SHP10 (trade name, manufactured by Tonen Tapyrus K.K.) were fixed by a metal frame, and they were placed in an oven of an atmospheric temperature of 80° C. for 20 minutes to perform a heat treatment.

Then, 100 parts by weight of a PTFE fine powder (Fluon CD-123, trade name, manufactured by Asahi-ICI Fluoropolymers K.K.) and 30 parts by weight of a liquid lubricant (liquid paraffin) were uniformly mixed. The mixture was pre-molded under the condition of 20 kg/cm$^2$, then extrusion molded into a rod-form, and further the rod-form product was passed between a pair of metal-made rolling rolls to obtain a long sheet-form molding having a thickness of 0.2 mm. Then, after removing the liquid lubricant from the sheet-form molding by an extrusion method using Trichlene, the sheet-form molding was wound round a tubular core in a roll form.

The sheet-form molding was drawn 30 times in the lengthwise direction at 370° C. by a roll stretching method. Then, the sheet-form PTFE molding was drawn 9 times to the width direction at 100° C using a tenter to obtain a PTFE porous film of a sintered state. The PTFE porous film was laminated with the heat-treated non-woven fabrics described above by a thermal lamination such that the PTFE porous film was interposed between the non-woven fabrics.

About the PTFE porous film air filer obtained as described above, the quantitative analysis of generated gases were carried out. The results are shown in Table 1 below.

TABLE 1

| Amounts of Generated Gases (μg/g) | | |
|---|---|---|
| BHT | DBP | Total |
| Example 1 — | — | 4 |

EXAMPLE 2

The PTFE porous film prepared in Example 1 was laminated with ELEVES T0153WDO (manufactured by UNITIKA LTD.) and TAPYRUS SN32ESB-SHP10 (manufactured by Tonen tapyrus K.K.), which were not heat-treated, by a thermal lamination such that the PTFE porous film was interposed between the non-woven fabrics.

The four edges of the PTFE porous film air filter prepared as described above were fixed by a metal flame, the air filter was placed in an oven of an atmospheric temperature of 120° C. for 5 minutes to perform a heat treatment and the quantitative analysis of the generated gases was carried out.

The results are shown in Table 2 below.

TABLE 2

| | Amounts of Generated Gases (μg/g) | | |
| --- | --- | --- | --- |
| | BHT | DBP | Total |
| Example 2 | — | — | 6 |

COMPARATIVE EXAMPLE 1

The PTFE porous film of the sintered state prepared in Example 1 was laminated with ELEVES T0153WDO (manufactured by UNITIKA LTD.) and TAPYRUS SN32ESB-SHP10 (Tonen Tapyrus K.K.), which were not heat-treated, by a thermal lamination such that the PTFE porous film was interposed between the non-woven fabrics.

About the PTFE porous film air filter obtained as described above, the quantitative analysis of the generated gases was carried out. The results are shown in Table 3 below.

TABLE 3

| | Amounts of Generated Gases (μg/g) | | |
| --- | --- | --- | --- |
| | BHT | DBP | Total |
| Comparative Example 1 | 3.5 | 0.15 | 29 |

As is clear from the results shown in Tables 1 to 3, it can be seen that in Examples 1 and 2 wherein the heat treatment was carried out, the PTFE porous film air filters giving less amounts of generated gases were obtained as compared with Comparative Example 1 wherein a heat treatment was not carried out.

As described above, a PTFE porous film air filter having an excellent property of not causing a problem of generating harmful gases, such as BHT and DBP, can be provided by laminating a non-woven fabric made up of fibers containing at least one kind selected from polyolefins and polyesters as the main components or a composite of these non-woven fabrics with a PTFE porous film after heat-treating the non-woven fabric or the composite of the non-woven fabrics at a temperature of from 80° C. to 130° C. for from 5 minutes to 20 minutes or by effecting such a heat-treatment after the lamination according to the present invention.

While the invention has been described in detail and with reference to specific embodiments thereof, it will be apparent to one skilled in the art that various changes and modifications can be made therein without departing from the spirit and scope thereof.

What is claimed is:

1. A production method of an air filter, which comprises heat-treating a non-woven fabric made up of fibers containing at least one kind selected from polyolefins and polyesters as the main component or a composite of the non-woven fabrics at a temperature of from 80° C. to 130° C. for from 5 minutes to 20 minutes and thereafter laminating the non-woven fabric or the composite thereof with a polytetrafluoroethylene porous film.

* * * * *